United States Patent
Zortea

Patent Number: 5,122,863
Date of Patent: Jun. 16, 1992

[54] METHOD AND APPARATUS FOR SIMULTANEOUS DISPLAY OF VIDEO SIGNAL ATTRIBUTES

[75] Inventor: Anthony E. Zortea, Reading, Pa.

[73] Assignee: Videotek, Inc., Pottstown, Pa.

[21] Appl. No.: 582,479

[22] Filed: Sep. 14, 1990

[51] Int. Cl.⁵ .............................................. H04N 17/02
[52] U.S. Cl. ........................................ 358/10; 358/22
[58] Field of Search ................ 358/10, 22, 80; 324/88

[56] References Cited

U.S. PATENT DOCUMENTS

| | | | |
|---|---|---|---|
| 3,614,304 | 10/1971 | Schonfelder | 358/10 |
| 4,488,168 | 12/1984 | Mino | 358/10 |
| 4,707,727 | 11/1987 | Penney | 358/10 |
| 4,754,269 | 6/1988 | Kishi et al. | 340/727 |

Primary Examiner—James J. Groody
Assistant Examiner—Kim Yen Vu
Attorney, Agent, or Firm—Eckert Seamans Cherin & Mellott

[57] ABSTRACT

A test apparatus for video signal produces a two dimensional projection of a three dimensional display of video variables. The variables can be luminance, saturation and hue; luminance, R-Y and B-Y color difference; red, blue and green amplitude; or luminance, I and Q, for example. The variables can be displayed with the R-Y and B-Y color differences on X and Y axes in a plane, with luminance on a Z axis perpendicular to the plane. The display is rotated for ease of viewing of the projection, and is preferably rotatable under operator control, in at least one axis of rotation. The axis of rotation can be in the plane of X and Y. A graticle which represents reference points in a standard vectorscope display can be superimposed on the projection. Points representing the saturation and hue phase angle of colors of a standard color bar test pattern, and graticle lines parallel to the Z axis, can also be included.

25 Claims, 2 Drawing Sheets $$x = \underline{X}(\cos \underline{a} \cos \underline{b})$$
$$+ \underline{Y}(\sin \underline{a} \cos \underline{b}) + \underline{Z}(\sin \underline{b})$$

$$y = \underline{X}(-\sin \underline{a} \cos \underline{c} - \cos \underline{a} \sin \underline{b} \sin \underline{c})$$
$$+ \underline{Y}(\cos \underline{a} \cos \underline{c} - \sin \underline{a} \sin \underline{b} \sin \underline{c})$$
$$+ \underline{Z}(\cos \underline{b} \sin \underline{c})$$

FIG. 6

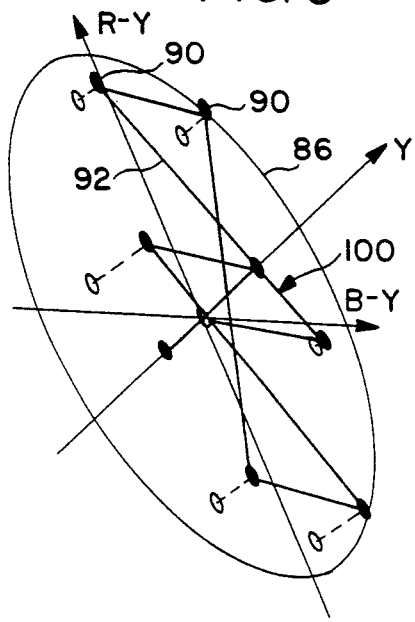

FIG. 7

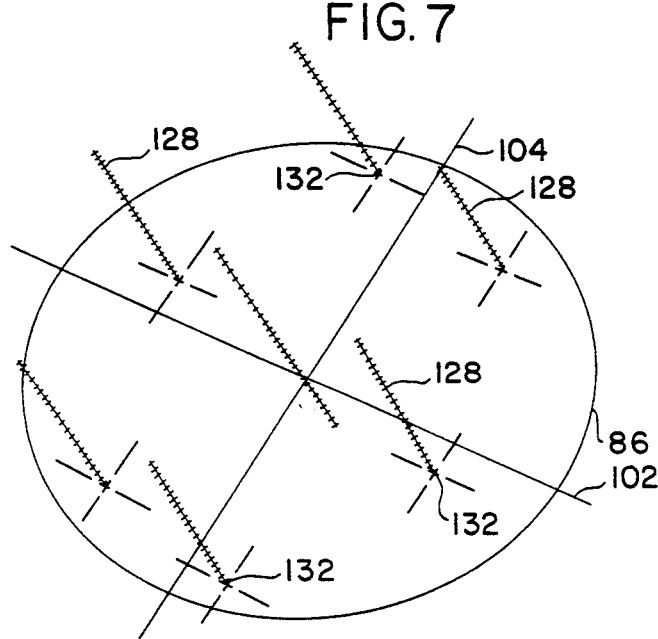

FIG. 8

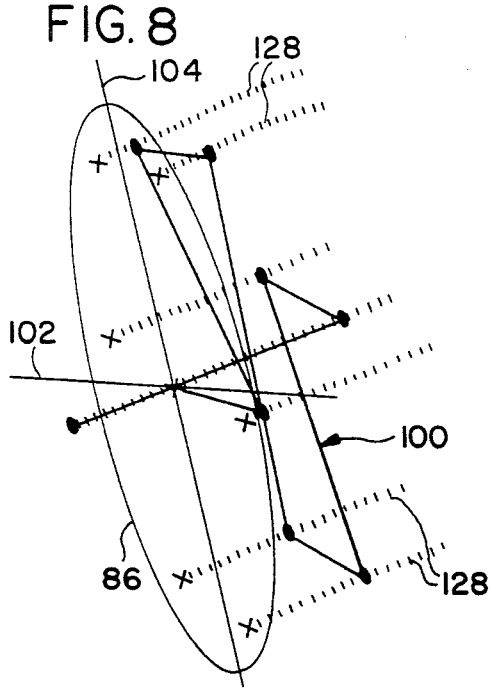

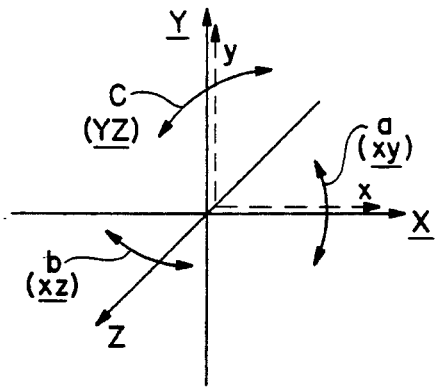

$x = \underline{X}(\cos \underline{a} \cos \underline{b})$
$\quad + \underline{Y}(\sin \underline{a} \cos \underline{b}) + \underline{Z}(\sin \underline{b})$ $y = \underline{X}(-\sin \underline{a} \cos \underline{c} - \cos \underline{a} \sin \underline{b} \sin \underline{c})$
$\quad + \underline{Y}(\cos \underline{a} \cos \underline{c} - \sin \underline{a} \sin \underline{b} \sin \underline{c})$
$\quad + \underline{Z}(\cos \underline{b} \sin \underline{c})$

FIG. 9

METHOD AND APPARATUS FOR SIMULTANEOUS DISPLAY OF VIDEO SIGNAL ATTRIBUTES

BACKGROUND OF THE INVENTION

1. Field of the Invention

This invention relates to the field of video test equipment, for example for use by video production facilities. The invention produces a simultaneous display of three of four possible characteristics defining color video signals. Preferably, the invention concerns an improved form of vectorscope display including representation of luminance, saturation and hue in a three dimensional presentation which can be rotated at the operator's option for examining the character of video signals, particularly test patterns. The invention is also applied to two dimensional projection of a three dimensional display including R-Y and B-Y color difference together with luminance (Y); or red, blue and green amplitude; or any three dimensions that in combination define a video signal at a point in time; or any two of three variables in these sets as a function of time.

2. Prior Art

Color video signals are encoded and broadcast in a manner requiring three variables to fully characterize the desired color display at a point in time, i.e., at a given point in the scanned field or raster. Alternatively or as required for various steps in the generation, transmission and/or display of the video signal, the three variables may represent, for example, luminance, saturation and hue; or red, green and blue amplitude; or luminance (Y) and color difference signals (R-Y and B-Y). In conventional test equipment for video signals, it is necessary to use at least two separate displays to represent all three of the variables at a point in time. Typically, a vectorscope or polar display indicates the saturation and hue, while luminance is displayed orthogonally as a function of time or against hue phase angle, using a separate two dimensional display. A dual two dimensional display configuration adequately displays up to four variables, but of course requires the operator to view the displays separately and involves the expense of two substantially complete sets of display apparatus.

One mapping of color space can be defined as the locations in three orthogonal dimensions of luminance, saturation and hue. Luminance, or brightness, is the level of light energy perceived by the viewer, varying from dim to bright. Saturation or vividness is a measure of how pale or intense the "color" portion of a signal is, independent of luminance. Hue is is the dominant wavelength or color of the light. Luminance is encoded in the video signal by the DC offset, saturation by the peak to peak amplitude of a subcarrier modulated onto the luminance, and hue by the phase angle of the subcarrier relative to a burst reference. Another color space can be defined as the locations in orthogonal dimensions of red, blue and green light, to represent the full spectrum of colors. The variables each vary in time.

According to the color difference method of encoding video signals, the primary color level signals, red, blue and green, are transformed into a format where the luminance (Y) information is transmitted separately and two color difference signals (R-Y and B-Y) encode the chrominance. This conversion can be made by a resistive matrix which algebraically combines proportions of each primary color signal to develop the chrominance and luminance. Inasmuch as the eye perceives different colors to inherently have different brightness, particular percentages are used in this transformation.

Luminance, for example, is 30% red, 59% green and 11% blue, reflecting the apparent brightness of the respective colors. In a color bar test pattern display for testing the accuracy of video equipment, the primary colors as well as colors resulting from combinations of the primary colors are shown as vertical bars positioned in luminance order across the display. The colors, in decreasing luminance order are yellow, cyan, green, magenta, red and blue (white and gray bars on the left, and black on the right, are added for reference). During every horizontal scan, the video signal thus progresses through the colors in decreasing luminance order. The hue phase angles of the colors do not correspond to their luminance order. In other words, the color bar display is not in order of wavelength, as in a rainbow. As a result a vectorscope display of a color bar test pattern (i.e., a polar display as a function of hue phase angle) does not form a regular polygonal shape, instead producing a characteristic, but irregular star-like shape. The display may be quite complicated when displaying a video signal that has features other than regular colored bars.

Standardized displays such as color bar test patterns are used to test the accuracy of video encoding, transmission and display. The color bar test pattern is quite useful as it includes information on luminance levels, chrominance levels, luminance to chrominance amplitude ratio, hue values, primary color values, and transition timing between luminance and chrominance and between the two color difference signals R-Y and B-Y. It is useful to analyze the color bar test pattern signal with respect to these parameters at various points to verify the accuracy of video encoding and also to ensure that subsequent processing of the encoded signal has not distorted it. It is also useful to view the variation in the respective signals over time.

U.S. Pat. Nos. 4,488,168—Mino and 3,614,304—Schonfelder disclose the application of a vectorscope to analysis of a color bar test pattern. A reference generator is locked to the burst. The video signal is separated into B-Y and R-Y signals by quadrature phase demodulation, and the demodulated B-Y and R-Y signals are applied as the X and Y inputs to a CRT. With reference to Mino, the resulting two dimensional display for a color bar test pattern has dots or patches for yellow and red in a first quadrant, magenta in the second, blue and cyan in the third and green in the fourth. As seen in Schonfelder the dots or patches are connected by lines due to the repetitive scanning of the vectorscope beam which occurs during each horizontal scan of the raster in the color test pattern signal as the displayed point moves with the progress of the scanning point of the raster through the respective color bars. The saturation of the signal is represented by the radius at each point on the display. (Saturation $= SQRT[(R-Y)2+(B-Y)2]$.). It is also possible according to the present invention to provide a vectorscope display wherein another variable (e.g., luminance) is effectively displayed orthogonally to the R-Y and B-Y axes. However due to the two dimensional nature of known displays it is not possible simultaneously to display three variables of interest.

U.S. Pat. No. 4,707,727—Penney discloses a so-called lightning display of video information. In a display of this type, one of the color difference signals represents the X axis component of a two dimensional display and the luminance is represented by the Y axis component. When displaying a color bar test pattern on such a device, the display appears as a zigzag line. Such a display can be used in conjunction with a standard vectorscope display, in which case the combination of the two displays can be examined with respect to three video variables, such as luminance, saturation and hue (or R-Y, B-Y, Y). However, in these two displays at least one of the variables appearing in each display also appears redundantly in the other display. Moreover, two substantially complete display apparatus are needed.

A lightning display format of luminance vs. color difference is similar to a graph of luminance vs. time, as can be obtained using a two dimensional display. Again, in order to display a full set of variables, the prior art uses two displays.

It is possible to display a three dimensional shape on a two dimensional display such as a CRT screen, by providing a two dimensional projection of the three dimensional shape. Computer assisted design (CAD) apparatus and the like are known wherein a three dimensional shape can be projected in isometric or perspective form on a two dimensional screen, or viewed from different perspectives in order to more clearly display a three dimensional shape in a way that is meaningful to humans. Typically, the display of a shape requires the generation of lines which are perceived as edges or surfaces of the shape. U.S. Pat. No. 4,754,269—Kishi et al discloses an arithmetic technique for converting coordinates in a three dimensional (XYZ) coordinate system or space, into projected coordinates on a two dimensional (XY) coordinate system, namely the surface of a flat display. According to Kishi, the angles of the individual axes relative to the edges of the display can be varied to change the perspective orientation, by plugging the desired angles into a trigonometric matrix conversion process.

According to the present invention, a polar format similar to a vectorscope is presented in a three dimensional form. This can be arranged according to the invention to provide a three dimensional network of lines at which the junctions of the lines correspond to the color information at different areas in a video signal. The apices appear as brighter points connected by relatively dimmer lines. The saturation and hue are shown as in a vectorscope display by the radius and phase angle of the displayed points. In addition, the luminance level at each point in the color bar test pattern is represented by a z axis or height level above a plane. The plane can be indicated by graticles if desired. The display as so configured is rotatable on at least one axis in the display under operator control for analyzing the video signal as a shaped surface. In viewing the presentation for a color test bar pattern, the display produces a plurality of points standing above a circular reference field (appearing elliptical when the display is rotated). The distance from the plane to the point represents luminance, and inasmuch as the luminance levels for the different colors vary, the color bar test pattern produces a standardized three dimensional body of dots at different apparent heights, connected by lines, in which the technician can readily compare all three video attributes to standard, using a single display. Similarly, according to the invention a simultaneous display of other three variable sets of data characterizing the video signal can be presented in the format of a two dimensional projection of three dimensional data, or the display can show two members of a three variable set against time.

SUMMARY OF THE INVENTION

It is an aspect of the invention to provide a convenient tool for examining the attributes of a video signal, particularly color bar test patterns, wherein all the attributes necessary to characterize the video signal at least at a particular time (i.e., a point or area of the video display) appear in a single display.

It is also an aspect of the invention to provide a method by which a video signal can be compared to a reference, with respect to each of three variables.

It is a further aspect of the invention to improve on the conventional vectorscope display wherein saturation and hue are displayed, by adding a third dimension to represent luminance.

It is yet another object of the invention to employ the three dimensional shape of a graph of at least three variables of a video signal to produce figures which skilled persons can readily recognize as accurate or inaccurate when a standardized test pattern is applied.

These and other aspects of the invention are obtained in a test apparatus for a video signal producing a two dimensional projection of a three dimensional display of video variables. The variables can be luminance, saturation and hue; luminance, R-Y and B-Y color difference; red, blue and green amplitude; luminance, I and Q; pairs of any of these variables together with time; or any three dimensions that can define a color video signal. In connection with a display of luminance, saturation and hue which improves upon the conventional vectorscope display, the variables can be displayed with the R-Y and B-Y color differences on X and Y axes in a plane, and luminance on a Z axis perpendicular to the plane. The projected display is rotated to provide a perspective view for ease of viewing of the projection, and is preferably rotatable under operator control as well, in at least one axis of rotation. The axis of rotation can be in the plane of X and Y or elsewhere, as desired, and the axis of rotation can be movable. A graticle which represents reference points or reference lines can be superimposed on the projection, for example indicia representing the axes and/or lines through expected standard values. Points representing the saturation and hue phase angle of colors of a standard color bar test pattern can be shown for example on a base plane in axes of B-Y and R-Y, and graticle lines parallel to the Z axis, can also be included to show levels of luminance.

Additional options can be provided by making the device switchable between a plurality of possible variable displays, with the appropriate graticles included or selected by the operator.

Brief Description of the Drawings

There are shown in the drawings embodiments of the invention as presently preferred. It should be understood, however, that the invention is not limited to the exemplary embodiments shown in the drawings, wherein:

FIG. 6 is a two dimensional projection of a three dimensional graph according to the invention, wherein luminance (FIGS. 3 and 5) appears along a projected Z axis of the polar graph (FIG. 4);

FIG. 7 is a reference line pattern including Z axis graticles at standard color saturations and hue phase angles in the color bar test pattern;

FIG. 8 illustrates rotation of the projection of FIG. 6, including a reference line pattern and graticles;

FIG. 9 is a diagram illustrating conversion of three dimensional XYZ coordinates to coordinates of a two dimensional x-y display field, for use in generating the rotated projection.

DETAILED DESCRIPTION OF THE PREFERRED EMBODIMENTS

Figure 1:
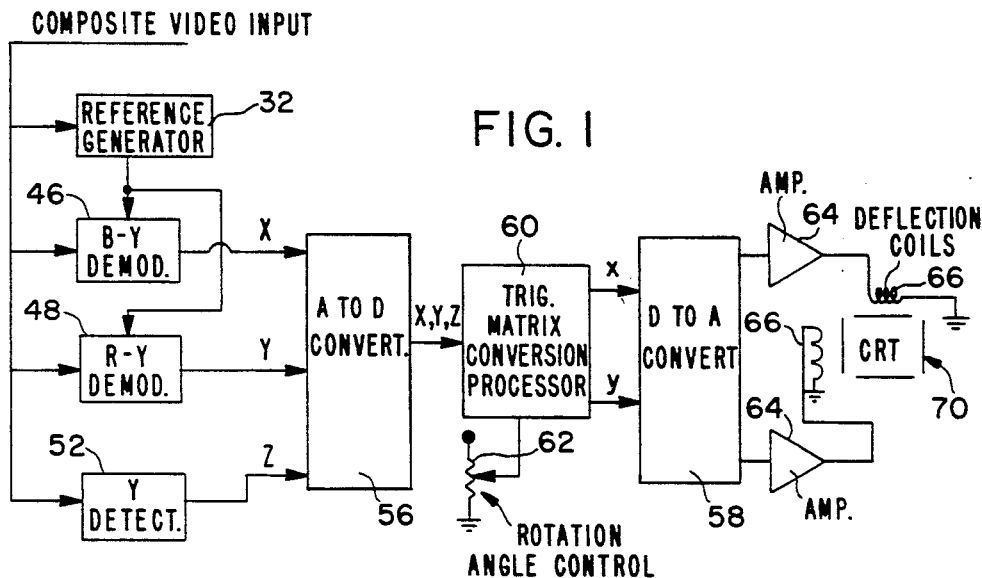
FIG. 1 is a block diagram showing the invention as applied to input from a composite video signal.

FIG. 1 shows the apparatus of the invention in block diagram form. A test apparatus for video equipment displays a two dimensional projection of video data on a screen of CRT 70. The projection is a two dimensional representation of a three dimensional set of video variables, shown in rotated or rotatable perspective. Preferably, the test apparatus is applied to a standardized video signal such as the color bar test pattern shown in FIG. 2, certain data variables of which are graphed in FIGS. 3-6 and 8. Video signals other than standardized patterns such as color bars can also be displayed and analyzed; however, signals encoding a limited number of discrete colors are most helpful in analyzing the operation of video generation, transmission, recording/playback and/or display equipment because such signals can be compared readily to well defined standards. A regular changing video broadcast signal, having widely varying characteristics, may be too complex to permit easy identification of problems in the video equipment. Nevertheless, any video signal will produce a three dimensional shape which can be visually monitored. Preferably, the shape can be turned to different perspectives under operator control for ready analysis of the character of the video signal at the desired point in its generation, transmission, recording, reproduction or display.

The test apparatus displays the values of three video variable simultaneously and in real time or frequently updated, by producing a means to display regularly sampled values of the variables in a three dimensional graph. Inasmuch as the display device of the test apparatus is itself two dimensional, the three dimensional information contained in three video variables is converted into a two dimensional projection, perceived by the operator as a perspective view of the three dimensional information.

The three video variables displayed can be luminance, saturation and hue phase angle. It is also possible to provide a similar three dimensional display of other sets of variables, such as luminance, R-Y color difference and B-Y color difference; luminance, I and Q (I and Q being another representation of color difference); or red, blue and green amplitude; or other such three variable sets which may be chosen. Any of these three variable systems will completely describe the character of a color display at least at a point in time, i.e., at a point in the video field. The display preferably operates continuously by repetitively sampling the video signal, to thereby continuously provide information regarding all of the video field, which is useful in a simultaneous test of a range of discrete colors as in a color bar test pattern. If combined with time as a further variable (e.g., time elapsed from the sync pulse in a horizontal scan line), any two of the variables in a three variable set can be displayed with the third dimension of the projection representing time. Of course, it is not necessary to use only those variables of a three variable set which together with time completely define the video display information. It is also possible to display variables which are related, e.g., red amplitude, saturation and B-Y color difference.

The invention is applicable to any set of three variables. For purposes of illustration, the apparatus of the invention is described herein with reference to a preferred display including luminance, saturation and hue phase angle, arranged such that the X and Y axes defining the base plane of the three dimensional projected graph represent R-Y and B-Y in cartesian coordinates, or saturation and hue in polar coordinates, and the Z axis represents luminance. The two dimensions of the base plane of this three dimensional presentation are the dimensions of the known vectorscope display. The base plane corresponds to the vectorscope display, rotated to obtain a perspective. Unlike a vectorscope or a "lightning" display, luminance information appears with both saturation and hue in a single graphic display at every point in the display.

In the color bar test pattern a given color is transmitted for the time period of horizontal scan through a respective one of the color bars. This period may include a plurality of sample intervals. The apparatus displays discrete points in the projected XYZ space for each of the colors displayed. Preferably, CRT 70 is operated to display the coordinate position of the last sample, and is updated to the next sample when the data is available. Subject to limitations on the speed of data processing by the apparatus, the samples can be taken on every horizontal scan, every other scan, etc. Where more than one sample is taken during the time the horizontal scan passes through a given color bar, the beam of CRT 70 dwells at the defined point in the two dimensional projection of the three dimensional data. As a result, the apparatus displays a bright spot for each of the colors, connected by dimmer lines traced by CRT 70 because of the small but non-zero transition time from color bar to color bar. The CRT therefore displays a three dimensional shape of relatively positioned spots, connected by lines.

Various means are known and used in typical video equipment for converting the signal between composite video format, RBG amplitude, color difference (R-Y, B-Y, Y) and/or luminance, saturation and hue. The invention is applicable to each, and is illustrated with reference to a composite video input signal. As shown in FIG. 1, the composite video input is coupled to a reference generator 32, color difference demodulators 46, 48 and a luminance detector 52. The color difference demodulators are coupled to the reference generator, which provides a signal corresponding in frequency and sync to the burst. The luminance detector provides a short term average of the amplitude of the composite video input, which can be accomplished by a low pass filter, peak detector or the like. The outputs of the color difference demodulators 46, 48 and the luminance detector 52 are sampled and digitized by A to D converter 56, preferably operable at a substantially greater rate than the rate of horizontal scan through the color bars such that a plurality of samples are obtained successively for each color. The three digitized variables define coordinate locations in a three dimensional pattern.

Figure 2:
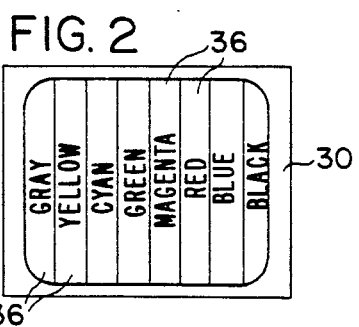
FIG. 2 illustrates a color bar test pattern.
Figure 3:
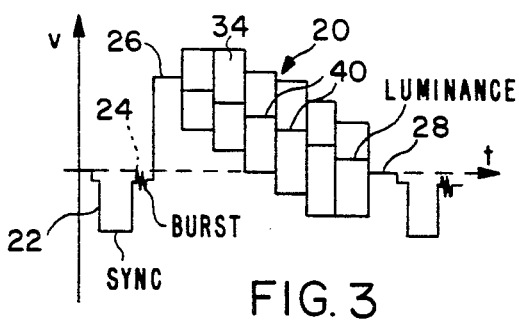
FIG. 3 is a graph of color bar signal vs. time for the color bar pattern of FIG. 2.

FIG. 3 illustrates the composite video signal 20 corresponding a horizontal scan through the bars 36 of a color bar test pattern as shown displayed on TV monitor 30 in FIG. 2. In addition to a sync pulse 22 and burst 24, the signal 20 includes a relatively higher amplitude white or gray section 26 and relatively lower amplitude black section 28 at the opposite ends. Intermediate the ends, the color band sections 34 are characterized by successively lower average values 40, which corresponds to luminance or brightness. The particular color displayed for each band section 34 depends on the phase difference between the AC portion of the signal and the color burst. The saturation level is encoded by the peak to peak amplitude of the AC signal.

Figure 4:
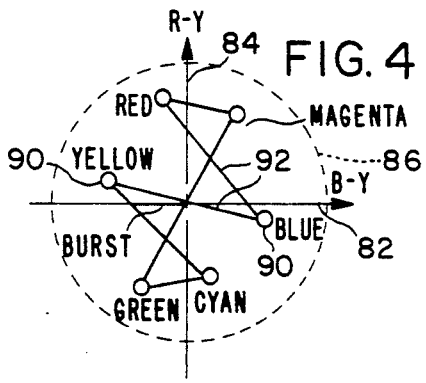
FIG. 4 is a two dimensional graph of color difference R-Y vs. color difference B-Y for the color bar pattern, which also can be considered a polar graph of saturation vs. hue phase angle.
Figure 5:
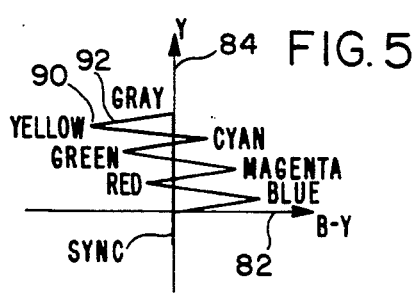
FIG. 5 is a two dimensional graph of luminance vs. color difference B-Y, corresponding to FIG. 4.

FIG. 3 is a graph of the video signal over time. FIGS. 4 and 5 are two dimensional graphs showing the video data points apart from time. FIG. 4 corresponds to a vectorscope display wherein the two color difference signals B-Y and R-Y represent the X and Y axes, respectively. The result is a polar display wherein the saturation is indicated by the radius and the hue phase angle is indicated by angular variation from a reference line (the negative X axis). This graph does not show luminance. FIG. 5 is a graph of luminance vs. one of the two color differences, and can be considered a side view of the graph of FIG. 4, wherein luminance is an additional axis perpendicular to the plane of the X axis (B-Y) and the Y axis (R-Y). According to the invention, these two presentations (or another set of three variables) are illustrated at the same time in a two dimensional projection of the three dimensional space in which the variable values fall.

The successive digitized samples obtained by A to D converter 56 (FIG. 1) are presented to a trigonometric matrix conversion processor 60. Conversion processor 60 calculates the projected position in a two dimensional field x,y of the three dimensional coordinates defined by the sample. Conversion processor 60 can be arranged to calculate the projection at a preset angle of perspective, at a plurality of selectable perspective angles, or can rotate the projection under operator control. One or more input means 62 are provided for allowing operator selection of rotation angles. In FIG. 1, the operator input means is illustrated as a potentiometer which is continuously adjustable over a range corresponding to angular rotation of the image relative to an axis. Alternatively or additionally, switch means can also be provided. The image can be rotatable, for example, on a predetermined axis such as one of the X, Y and Z axes, rotatable on more than one of these axes as controllable individually by the operator, or rotatable on an axis which does not correspond to the X, Y or Z axis. Suitable rotations are illustrated in FIGS. 6-8, again with reference to the preferred example wherein the two color differences and luminance represent the variables displayed.

A preferred conversion technique is illustrated in FIG. 9. The two dimensional display surface is designated by dotted line axes x and y, and the three dimensional projected axes are shown as solid lines $\underline{X}$, $\underline{Y}$, and $\underline{Z}$. The values of x and y are calculated trigonometrically from the values of $\underline{X}$, $\underline{Y}$ and $\underline{Z}$ and from the angles by which the projected display is rotated in the $\underline{XY}$ plane (angle $\underline{a}$), the $\underline{XZ}$ plane (angle $\underline{b}$) and the $\underline{YZ}$ plane (angle $\underline{c}$) as shown. The conversion to obtain a two dimensional isometric projection of the rotated three dimensional data can be accomplished according to the relation:

$$x = X(\cos a \cos b) + Y(\sin a \cos b) + Z(\sin b) \quad (1.)$$

$$y = X(-\sin a \cos c - \cos a \sin b \sin c) + \quad (2.)$$
$$Y(\cos a \cos c - \sin a \sin b \sin c) + Z(\cos b \sin c)$$

Another example of a matrix conversion method for accomplishing a conversion is disclosed, for example, in U.S. Pat. No. 4,754,269—Kishi et al, which is hereby incorporated. In Kishi one of the variable axes (the $\underline{X}$ axis, for example) can run parallel to one of the display axes (e.g., x), as shown in FIGS. 6 and 8, which show rotated displays including color bar data. Alternatively, the axes can be different, as shown in FIGS. 7, and generally in FIG. 9. Assuming the x and $\underline{X}$ axes are parallel, the value along the x axis is nevertheless foreshortened due to rotation of the projection. If the Z axis as projected is rotated counterclockwise from the positive x axis by an angle $\phi$ and the $\underline{Y}$ axis is rotated clockwise from the negative x axis by an angle $\phi$, an isometric projection of the $\underline{XYZ}$ data on the xy plane can be obtained according to the following relation, which is a more limited case than that shown in FIG. 9:

$$x = X + Z^*\cos\phi - Y^*\cos\phi \quad (3)$$

$$y = Z^*\sin\phi + Y^*\sin\phi \quad (4)$$

According to these or similar trigonometric conversion techniques, the xy projected location is calculated for each sample triplet to be displayed, providing a list of points in the display field to be illuminated. Conversion processor 60 presents the listed points sequentially to D to A converter 58, converting the calculated values for x and y back to analog form. The analog signals are coupled to amplifiers 64, which provide the current to drive the vertical and horizontal deflection coils 66 of CRT 70. In this manner the CRT display provides a series of spots representing a projection of coordinates of the video data for the discrete color bars in the video signal. The three dimensional nature of the display, namely a shape defined by a plurality of spots connected by repetitively scanned lines, can become a familiar shape (for standardized test patterns such as color bars), whereby the characteristics of the video signal can readily be compared by skilled persons to the expected characteristics (i.e., shape), for quick determination of any anomalies in the generation, transmission or display of the standardized signal. Rotation of the shape permits the operator to view the shape as a whole, as in FIGS. 6 and 8, or to emphasize individual variables such as luminance (FIG. 5) or hue and saturation (FIG. 4). Similar standardized shape presentations are also obtained with other three variable data sets.

Trigonometric conversion techniques can be used to display and/or rotate a display as in FIGS. 7 or 9, wherein none of the $\underline{X}$, $\underline{Y}$ and $\underline{Z}$ axes correspond to the display axes. Preferably, a reference grid, graticule or the like is superimposed on the projection to define a reference surface or reference lines against which the projected shape can be compared. In the preferred embodiment wherein the three displayed variables are luminance, saturation and hue (in cylindrical coordinates) or luminance, B-Y and R-Y (in cartesian coordinates), the base plane can be shown as a circle, rendered elliptical in projection, and the luminance shown on the Z axis against Z axis graticles arising from the base plane at the saturation and hue angle positions of the standard color bar colors. FIG. 7 illustrates a reference line pattern for the projection of FIG. 6. The reference line pattern includes, for example, one or more of: a polar coordinate reference including axis lines 102, 104; reference marks 132 in a base plane, such as the plane of the axes 102, 104; a Z axis reference line (not shown); and lines parallel to the Z axis intersecting the base plane reference marks. As shown in FIG. 7 for the lines parallel to the Z axis, one or more of the reference lines can include graduated markings, whereby the variables can be quantified. The reference lines can be limited or extensive. The reference lines can be made selectable by the user. The reference grid or the like can be stored as a list of three dimensional coordinates, and the same trigonometric matrix conversion used to convert the coordinates of the data points of the three video variables into the projected display is used as well to convert the reference lines into projected perspective reference lines. Alternatively, the two dimensional coordinates of reference lines for preset perspective angles can be stored and read out when selected. In either case the angle of rotation of the three dimensional display can be varied as required.

FIG. 6 illustrates a display wherein the three variable data is presented as a shape, and the base plane positions of the spots (or standard coordinates of an accurate color bar's data) are indicated. This presentation is useful in that the base plane spots appear as the shadows of the spots disposed above the base plane, tending to emphasize the three dimensional nature of the display. In FIG. 6, one of the axes (the B-Y axis, for example) is orthogonal to the display, i.e., horizontal. The remaining two axes are inclined relative to the display. In FIG. 7, the axes are all inclined relative to the display axes. FIG. 8 illustrates the display when rotated to obtain a lower angle of perspective relative to the base plane. Rotation is accomplished by changing the angle of inclination of the axes relative to the display, being perceived by the operator as rotation of the display around aa vertical center line of the display. In connection with a display of B-Y, R-Y and Y, a lower perspective emphasizes luminance and a higher perspective emphasizes saturation and hue.

The color bar test pattern 100 includes all the information in two displays of two dimensional data. The information is not limited to the color data. As shown in FIGS. 3, 6 and 7, the sync pulse on the video signal as well as the luminance data of the uncolored white or gray and black bars also appear. The sync pulse appears as the negative leg of shape along the Z axis and the white or gray band appears as the positive leg.

The invention having been disclosed with reference to an exemplary embodiment, variations within the scope of the invention will now become apparent to persons skilled in the art. Reference should be made to the appended claims rather than the foregoing specification in order to asses the scope of the invention in which exclusive rights are claimed.

I claim:

1. A test apparatus for a video signal, comprising:
   means operable to produce signals representing three variables in the video signal; and
   means for producing a two dimensional projection of the three variables in three dimensions and for displaying the two dimensional projection for viewing.

2. The test apparatus according to claim 1, wherein the means operable to produce signals representing the variables produces at least one set of:
   luminance, saturation and hue;
   red, blue and green amplitude;
   luminance, R-Y color difference and B-Y color difference; and,
   luminance, I and Q.

3. The test apparatus according to claim 2, wherein the variables include luminance, saturation and hue and the projection represents a polar display of saturation as a function of a phase angle of the hue, with luminance represented by height above a plane of the polar display.

4. The test apparatus according to claims 1 or 3, further comprising means for rotating the two dimensional projection around at least one axis of rotation.

5. The test apparatus according to claim 4, further comprising means for applying to the two dimensional projection a graticle indicating a plane of two of said three variables.

6. The test apparatus according to claim 5, wherein the graticle includes at least one reference line in said plane of two of the three variables.

7. The test apparatus according to claim 6, wherein the reference line includes at least one of a line representing a zero value of one of said variables, mutually perpendicular lines representing a zero value of two of said variables, and a circle centered on a zero value of two of said variables.

8. The test apparatus according to claim 5, wherein the reference line includes a three dimensional representation of the two dimensional projection, including lines indicating a position of colors of a standardized color bar test pattern.

9. The test apparatus according to claim 3, further comprising means for rotating the two dimensional projection around at least one axis of rotation, wherein the two dimensional projection represents a Cartesian coordinate display of R-Y color difference and B-Y color difference on mutually perpendicular X and Y axes, with luminance displayed by distance along a Z axis perpendicular to a plane of the X axis and Y axis.

10. The test apparatus according to claim 9, wherein the at least one axis of rotation is aligned to one of said X axis and said Y axis.

11. The test apparatus according to claim 10, wherein the X axis and the Y axis are inclined relative to vertical in the two dimensional projection.

12. An improved vectorscope display of video variables, of a type wherein color difference signals R-Y and B-Y of a video signal are displayed in cartesian coordinates in a plane, thereby producing a polar display of saturation as a function of phase angle, wherein the improvement comprises:
   the cartesian coordinates being rotated around an axis of rotation to obtain a two-dimensional projection in the display; and,
   means for indicating on the two dimensional projection a luminance level, by distance along a Z axis perpendicular to the plane of color difference signals.

13. The improved vectorscope display according to claim 12, further comprising means controllable by an operator for varying rotation of the two-dimensional projection around said axis of rotation.

14. The improved vectorscope display according to claim 13, wherein the two-dimensional projection is rotatable around a plurality of axes.

15. The improved vectorscope display according to claim 14, wherein at least one of said plurality of axes is in the plane of the color difference signals.

16. The improved vectorscope display according to claim 15, further comprising means for applying at least one reference line to the two-dimensional projection for indicating at least one of said plane, said cartesian coordinate and said Z axis.

17. The improved vectorscope display according to claim 15, further comprising at least one reference line for a predetermined attribute of a standard video test pattern.

18. The improved vectorscope display according to claim 17, comprising a plurality of reference lines parallel to the Z axis and disposed at the plane of color difference signals at saturation and hue positions for colors in a standard color bar test pattern.

19. A method for displaying attributes of a video signal comprising the steps of:
producing signals representing three variables in the video signal; and,
displaying a two dimensional projection of the three variables in three dimensions.

20. The method according to claim 19, wherein the three variables are chosen from the sets of:
luminance, saturation and hue;
red, blue and green amplitude;
luminance, R-Y color difference and B-Y color difference; and,
luminance, I and Q.

21. The method according to claim 19, wherein the variables include luminance, saturation and hue and the two-dimensional projection represents a polar display of saturation as a function of phase angle of the hue, with luminance represented by height above a plane of the polar display.

22. The method according to claim 19 or 21, further comprising rotating the two-dimensional projection around at least one axis of rotation.

23. The method according to claim 19, further comprising applying to the two dimensional projection at least one reference line indicating a plane of two of said three variables.

24. The method according to claim 23, wherein the reference line includes a three-dimensional representation of the two-dimensional projection, including lines indicating a position of colors of a standardized color bar test pattern.

25. The method according to claim 24, further comprising rotating the two-dimensional projection around at least one axis of rotation, wherein the two-dimensional projection represents a cartesian coordinate display of R-Y color difference and B-Y color difference on mutually perpendicular X and Y axes, with luminance displayed by distance along a Z axis perpendicular to a plane of the X axis and Y axis.

* * * * *

UNITED STATES PATENT AND TRADEMARK OFFICE
CERTIFICATE OF CORRECTION

PATENT NO. : 5,122,863
DATED : June 16, 1992
INVENTOR(S) : Anthony E. Zortea

It is certified that error appears in the above-identified patent and that said Letters Patent is hereby corrected as shown below:

In column 8, line 25, the symbol "∅" should be changed to --⊖--.

In column 8, line 30, the symbol "∅" should be changed to read --⊖--.

In column 8, line 32, the symbol "∅" should be changed to read --⊖--.

Signed and Sealed this

Ninth Day of November, 1993

Attest:

BRUCE LEHMAN

*Attesting Officer*     *Commissioner of Patents and Trademarks*